(12) United States Patent
Johnsen

(10) Patent No.: US 7,941,261 B2
(45) Date of Patent: May 10, 2011

(54) BRAKE FUNCTION BASED ON CONTROLLING ACCORDING TO ACCELERATION

(76) Inventor: Oddvard Johnsen, Lier (NO)

( * ) Notice: Subject to any disclaimer, the term of this patent is extended or adjusted under 35 U.S.C. 154(b) by 853 days.

(21) Appl. No.: 10/599,783

(22) PCT Filed: Apr. 15, 2005

(86) PCT No.: PCT/NO2005/000116
§ 371 (c)(1),
(2), (4) Date: Oct. 10, 2006

(87) PCT Pub. No.: WO2005/100112
PCT Pub. Date: Oct. 27, 2005

(65) Prior Publication Data
US 2007/0203633 A1 Aug. 30, 2007

(30) Foreign Application Priority Data
Apr. 15, 2004 (NO) .................................. 20041541

(51) Int. Cl.
G06F 19/00 (2006.01)
G06F 7/70 (2006.01)
G06G 7/00 (2006.01)
G06G 7/76 (2006.01)

(52) U.S. Cl. ................. 701/70; 701/71; 701/78; 701/79; 701/82; 701/83; 303/125; 303/126

(58) Field of Classification Search .................... 701/78, 701/79, 70, 71, 82, 83; 303/125, 126
See application file for complete search history.

(56) References Cited

U.S. PATENT DOCUMENTS

| 3,920,282 | A | * | 11/1975 | DeVlieg ...................... 303/113.5 |
| 4,327,948 | A | * | 5/1982 | Beck et al. .................... 303/194 |
| 4,454,582 | A | * | 6/1984 | Cleary et al. ................... 701/15 |
| 4,773,013 | A | * | 9/1988 | Crapanzano et al. ........... 701/79 |

(Continued)

FOREIGN PATENT DOCUMENTS
NO 320851 B1 10/2005
(Continued)

OTHER PUBLICATIONS

Johnsen, Oddvard, Improving Braking Action Reports, AeroSafetyWorld, Aug. 2007, pp. 36-40, vol. 2, Issue 8, Flight Safety Foundation, Inc.

Primary Examiner — Khoi Tran
Assistant Examiner — Jaime Figueroa
(74) Attorney, Agent, or Firm — Edmonds & Nolte, PC

(57) ABSTRACT

A brake controller function to optimally brake a wheel of a vehicle in motion, such as an aircraft. The brake pressure control self regulates by means of applying brake pressure in accordance with vehicle acceleration information and the change in acceleration over time in the horizontal plane. Vehicle acceleration and information about its change enable a brake pressure control function to determine the brake pressure associated with maximum obtainable retardation for a vehicle at that given point in time. By continuously monitoring acceleration change and detecting retardation pinnacles, the culmination and turning points of retardation, with their associated brake pressure, maximum braking ability is assured at any given time. By applying acceleration data in real time as a controls reference in a brake logic control function to increase or reduce brake pressure, such a brake control function will assure a brake pressure perfectly fit with net of all the forces that a vehicle is subjected to. It will ensure optimal brake level with respect the vehicle tire/pavement surface interface.

20 Claims, 4 Drawing Sheets

Illustration

U.S. PATENT DOCUMENTS

| | | | |
|---|---|---|---|
| 4,958,512 A | 9/1990 | Johnsen | |
| 5,195,808 A | 3/1993 | Johnsen | |
| 5,249,851 A | 10/1993 | Johnsen | |
| 5,413,461 A | 5/1995 | Johnsen | |
| 5,797,663 A * | 8/1998 | Kawaguchi et al. | 303/146 |
| 5,814,718 A | 9/1998 | Andresen et al. | |
| 5,951,122 A * | 9/1999 | Murphy | 303/163 |
| 5,968,106 A * | 10/1999 | DeVlieg et al. | 701/70 |
| 6,023,649 A * | 2/2000 | Matsuura et al. | 701/71 |
| 6,122,585 A * | 9/2000 | Ono et al. | 701/71 |
| 6,128,567 A * | 10/2000 | Suzumura | 701/71 |
| 6,178,370 B1 * | 1/2001 | Zierolf | 701/71 |
| 6,507,781 B2 * | 1/2003 | Maruko et al. | 701/70 |
| 6,681,168 B2 * | 1/2004 | Polzin | 701/83 |
| 6,890,041 B1 * | 5/2005 | Ribbens et al. | 303/126 |
| 2001/0038242 A1 * | 11/2001 | Soejima et al. | 303/113.1 |
| 2003/0014174 A1 * | 1/2003 | Giers | 701/70 |
| 2003/0025035 A1 * | 2/2003 | Park | 244/111 |
| 2004/0220714 A1 * | 11/2004 | Rudd, III | 701/71 |
| 2006/0243857 A1 | 11/2006 | Rado | |
| 2007/0203633 A1 | 8/2007 | Johnsen | |

FOREIGN PATENT DOCUMENTS

NO 325391 B1 4/2008

* cited by examiner

Fig 1. Principal Friction Curve
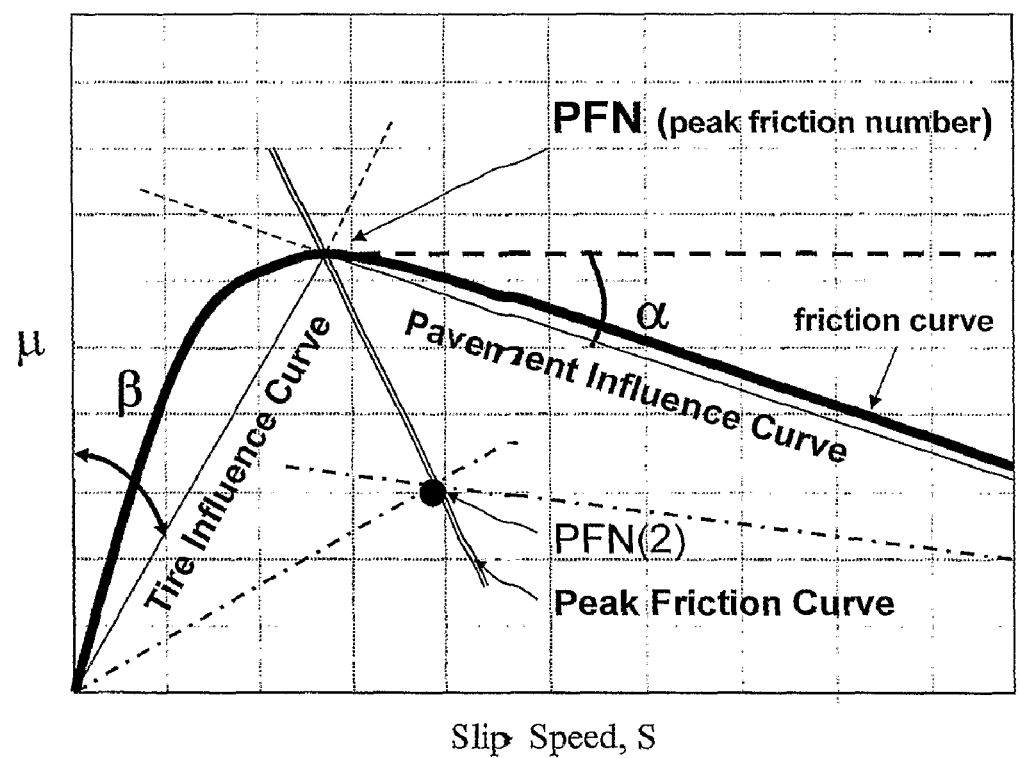

Fig. 2. Velocity Dependent Friction Curves
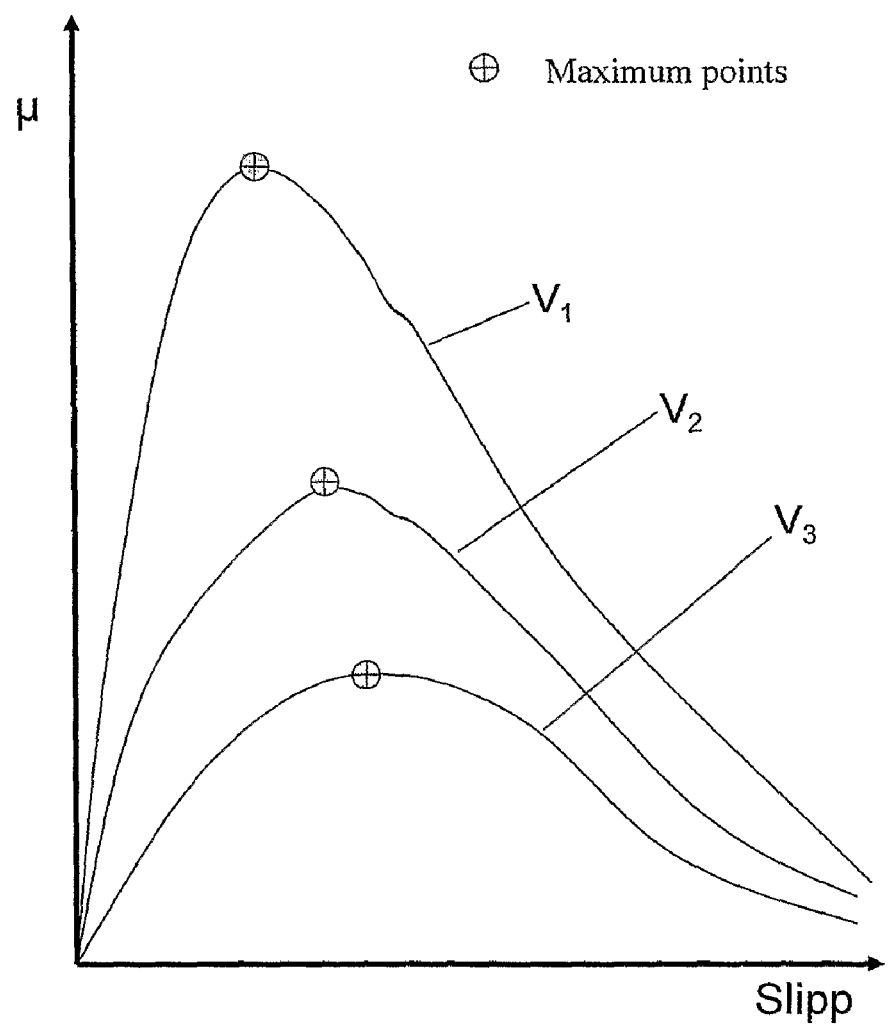

Fig. 3. Illustration
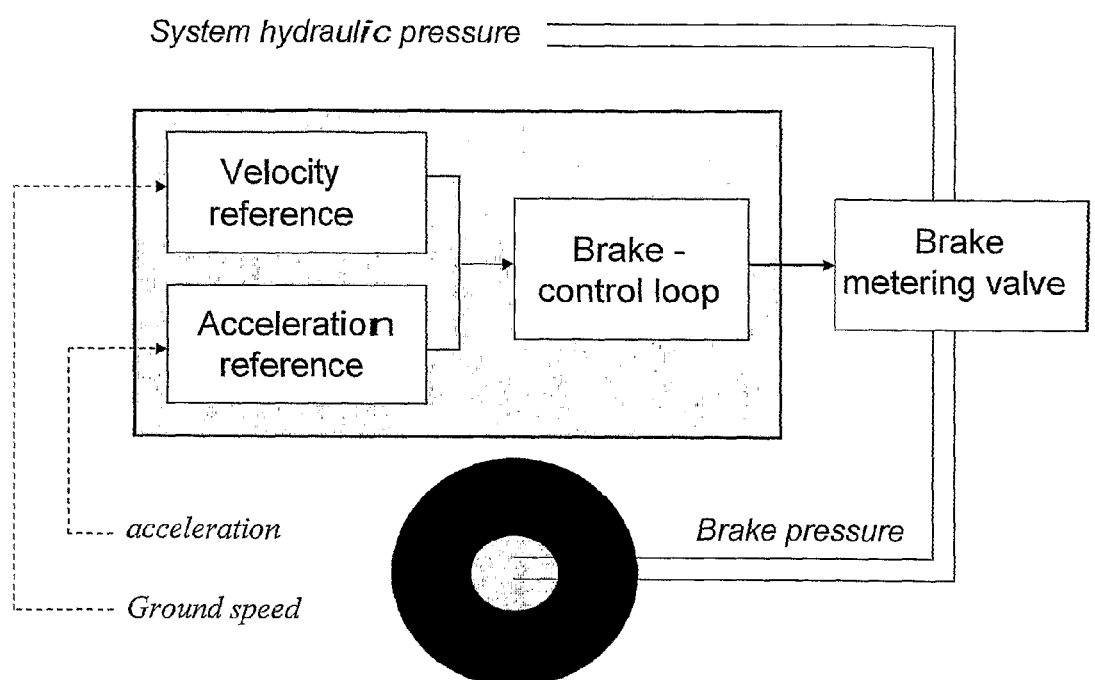

Fig. 4. Flow Chart
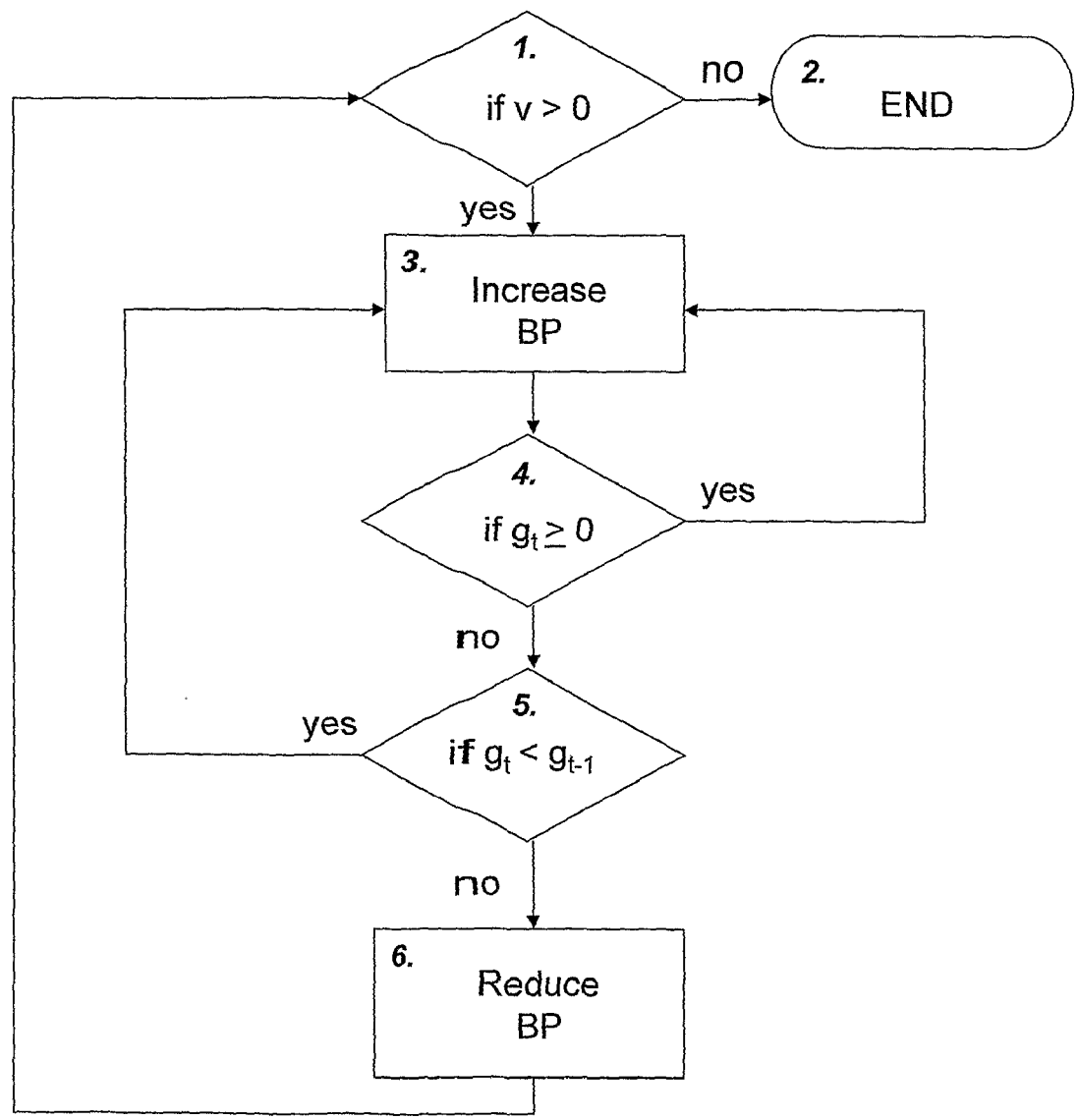

BRAKE FUNCTION BASED ON CONTROLLING ACCORDING TO ACCELERATION

A brake function based on control in relation to acceleration, where a the brake control loop provides an optimal braking process of a vehicle or aircraft in respect of defined pavement surface.

This innovation has its primarily beneficial apply in the area aircraft dependable on an optimal stop on a defined landing stop way, or an aircraft performing an "accelerate stop", i.e. highest certification ground velocity during take-off before deciding stop before lift off. The later situation is where the pilot may decide aborted take-off during high velocity before the aircraft has become "airborne". Runway overruns indicate statically high figures. About 30% of all the world accidents is being concerned of runway overruns ether during take-off or landing, and where the case directly or indirectly might be linked to wheel brake function in relation to tire/surface condition interface.

State of art brake control systems for aircraft, hereby defined as anti-skid brake logic, do ignore several relations to circumstances concerning both laws of friction and laws of physics, this being referred to due various climatic conditions over the entire world. Initially this would bring well-developed brake systems less effective when needed most, when runway surface is more slippery than dry pavement surface.

This innovation bases knowledge on friction analysis behaviour between a rolling wheel and surface interface. FIG. 1, "Principle Friction Curve", do illustrate state-of-art accepted definitions tied to friction analysis of pavement surface. Main basis of this friction curve define what is happening when increasing brake torque pressure at a uniform groundspeed, represented by a friction analysis vehicle equipped with a standardized friction-measuring wheel. On this FIG. 1 illustration several definitions are to be observed. These are as follows:

| | |
|---|---|
| μ | Mu - definition of friction |
| Slip | Relationship between a free rolling wheel and a braked wheel. |
| PFN (peak friction number) | Top (Peak) Point of Friction tire/surface interface. |
| Tire Influence Curve | Rising curve, left side of PFN. Segment of friction curve, which describe wheel/tire material structure composition. |
| Pavement Influence Curve | Falling curve, right side of PFN, which describe pavement material structure composition/wear and tear. |
| Beta angle (β), | Tire Influence Curve angle, define tire properties. |
| Alfa angle (ά), | Pavement Influence Curve angle, define pavement surface properties. |
| PFN (2) | Same wheel/tire at an other uniform speed including a lower Top Point of Friction. |
| Peak Friction Curve | Velocity Variable Curve of PFN. |

FIG. 1 indicate that associated friction, officially defined as Mu (μ), between a tire and pavement surface will vary, and that slip figure will vary accordingly, including that slip also will vary with variations in contaminated boundary tire/surface interface.

An overall behaviour pattern in this straightforward process is that before brakes will be applied outer forces applied to the associated wheel be limited to rolling resistance. When, during the actual braking pattern in an ongoing process the braking action will vary according to brake torque application input to an increased friction—Mu. Friction will further according to increased brake torque input reach a Top Point of Friction, by international definition—PFN, (Peak Friction Number), and from there on increased brake torque input will decrease friction tire/surface interface. Slip increases as a direct result of increased brake torque input.

On dry pavement condition the peak point of rubber elastics might be overextended at slip number extending PFN, this where rubber material will be thorn off, and perhaps even pieces of pavement material. When the very point of slip figure has extended PFN tire/surface interface is usually defined as the [beginning] of skid. This point might as well be defined as a situation of "overbraking", i.e. at the very point of too much brake torque input in relation to surface condition and what is achievable of braking coefficient from the contaminated surface layer.

FIG. 2. "Velocity variable friction curves", illustrates how velocity influences friction value and variations during velocity variations. For instance when performing braking to a full stop of a vehicle/aircraft. When braking, no vehicle maintains a constant speed throughout the braking process. These various illustrated curves are defined as $v_1$, $v_2$ and $v_3$ and are all marked with various velocity at their individual PFN. As what might be seen is that for a defined vehicle maximum friction including associated slip will vary with velocity. Drawing a curve true all velocity variable PFN will define a slip velocity curve. The angle appearance of such curve will vary with varying of braking action. During good braking action, like in summer, this curve will act steep, while when raining, snow, ice etc. this curve will appear more flat.

Consequently, friction is not a material property, however the relationship and interactive forces continuously taking place between and in the interface of a contaminated layer between a wheel tire and pavement surface. Major sources of influence will depend on type of contamination (for instance medium like dust, pollen, water, snow ice etc), and will therefore become a dynamic function factor. This explains why friction might be experienced different, like for instance various performances of various types of aircraft or vehicles, this in spite of contamination initial objective relation being the same.

Based on this background an understanding must be achieved of element influencing an aircraft when attempting a successful braking/stopping from initial up to ground velocity of between 200-300 km/hr. to full stop.

Need for anti-skid bake control logic functions within aviation industry came as result of technologic development, increased size and tonnage of aircraft. This again demanded more heavier solid dimensioned wheels, including power brake systems, and thereby also need for servo-controlled brakes. The need was obvious avoiding unforeseen wear and tear including burned marks on tire rubber, including risk of tire fatigue if wheel rotation partly or fully stopped rotating.

Early anti-skid brake systems drew the benefit of direct mechanic solutions like; where individual wheels during rotation used centrifugal principle of controlling brake pressure valve system open or closed. Centrifugal weights commanded brake pressure valves to be remained open when wheel rotation pattern forced weights to be slung out. "Collapse" of wheel rotation to be signal of bleeding brake pressure. Within aircraft industry anti-skid servo-control brake system design always tap hydraulic energy from high pressure feed line system ("upstream") where distribution valves modulate brake energy pressure to representative wheel brakes ("downstream"), then close to wheel brakes anti-skid valves enables further modulation of brake energy pressure via return lines to hydraulic reservoir.

Latest modern electronics functions has taken over for pure mechanical solutions, further related industry has further developed knowledge of tire/surface friction, a state of condition not always necessarily a homorganic issue over a field of runway pavement surface, or road. By drawing direct benefit of such, anti-skid brake logic has developed into basis of monitoring wheel-to-wheel rotation inconsistency comparison and thereby modulating brake energy pressure. All to all brake industry has continued this philosophy pattern. Within aviation industry this is usually defined as "anti-skid brake logic design" (not ABS as within automobile industry). As for state-of-art anti-skid brake systems in the market, identification will be like classification were "Mark I" and "II" for instance concern early systems. "Mark III" arrived in the 60ies, while "Mark IV and Mark V" now are the latest model available in the market. Very many aircraft in operation however do operate "Mark III" systems.

Experience from ever-new development within electronics has indicated that due the aircraft wide spread of ground velocity operation validates, anti-skid brake logic would benefit from splitting even more up. Latest models have therefore developed an extended version of anti-skid logic to identify single wheel rotation irregularity and where each individual wheel will be issued a separate brake energy adjustment. "Wheel to wheel" comparison as in Mark III models will then be coordinated service duty during lower ground velocity while individual wheel rotation irregularity logic will be precedence while higher ground velocity. This further development of logic play a major role in "Mark IV" and "V" models, where now "wheel to wheel" play the important role when for instance aircraft hit ground during landing ("anti lock") and where wheels will be at stand still before spinning up to much higher rotation speeds, and where logic transform again. However, as being observed, main logic for all anti-skid brake logic will be unchanged representing a single-factor solution.

A further developed principle from "Mark IV" and "V" anti-skid logic is a model, which also defines optimal slip number. Various manufacturers use various slip figures, like in the area of 10-13 percent. Such practical solution demand a digital accurate velocity as reference, which is available true electronic registration from aircraft navigation data/information sources, for instance where the aircraft is equipped with several types of navigational references in real time registration ground velocity and acceleration. Pulsar signals from free rolling nose wheel however have also been used for such purpose. The intention behind philosophy is avoiding high and uncontrolled slip condition of braked wheel and limit algorithmic control loop in benefit of better braking efficiency. Industrial development thereby have tried to introduce a double-factor solution, though based on a random reference which will be leading to a imprecise computer algorithm solution observed from a optimal braking pattern concern. Actual braking pattern will be limited to a narrowed gape of slip implemented from dry surface condition, including limited efficiency as such. Further logic will not include reliable control of brake energy in relation to conditions like velocity variation on wet, partly wet, or frozen contamination. Brake energy will therefore initially become less optimal. Overbraking will still be possible due slippery conditions; namely, anti-skid logic is based on wheel rotation/variation alone.

Individual wheel irregularity logic will also find difficulties of identification on continuous rather uniform slippery surface. PFN slip will vary continuous, not only referring to one single velocity still picture frame, but for all velocity still picture frames, thereby limiting defined braking logic limited to i.e. 10 or 13 percent over an entire scale of acceleration/velocity. What fit a dry surface, does not necessary fit a wet surface and far from that a frozen contaminated surface. As for the two last case by experience, during lower ground velocity on a wet surface braking action increase, water under the tire footprint have time for escape, while when contamination is frozen this will be the other way around. When reaching lower ground velocity wheel temperature will have time for melting process and thereby vanish micro texture potential braking coefficient/braking action. This is a well known phenomena known to pilots in winter cold regions.

Documented from dynamic friction analysis, slip number values all up to 35-40 percent have been observed as most favourable from a PFN point of concern during very slippery situations.

Some Mark III, but all Mark IV and V anti-skid brake systems do have automatic brake function added to normal foot pedal braking function. "Auto Brake" which is the definition, function on demand of pilot decision of selecting an automatic braking function, expressed as "Auto Brake" mode selection of 1, 2, 3, MAX or RTO—(Rejected take-off). Latest function concerns take-off only. Each and every mode of selection is based on a chosen rate of deceleration. Within aviation interests for instance feet/sec.$^2$ is being used as expression on basis for retardation figures, preferable being used instead of meters/sec.$^2$ or "g". Each one of the retardation level figures do have a corresponding defined maximum brake energy pressure being fed up to proportional brake pressure metering valves located ahead of anti-skid brake valves close to the wheel brakes. Intention behind grading of acceleration/deceleration levels is that by choice to select a lower retardation pattern, feet/sec.$^2$ retardation where extended stopping distance above balanced braking pattern is present and available. However to be noticed is that aircraft manufacturers recommend a high deceleration rate selection, feet/sec.$^2$ figure (high limited brake energy pressure) if there exists a risk of slippery conditions, though without taken into consideration the ever variation in ground velocity.

Key to such problem is to be found already in initial basic logic-friction limited scenario; used brake pressure generates more braking torque than surface friction can support. Thus in friction limited case an increase in brake pressure energy does not result in increased generated wheel friction. Retardation might even decrease or go to zero. It is therefore difficult to understand/accept chosen logic of using maximum brake energy pressure, this observed from a point of velocity continuously variation, further since chosen philosophy basis on supplying high boosted brake energy pressure via metering valves depending on an anti-skid metering process logic which originally has an other design status. Then at the same time anti-skid logic also will search for random limit of 10% slip, as earlier mentioned more suitable for dry pavement conditions, even with vague reference accordingly.

Initially it seems that related industry do have wishes that are beyond reach and further basis information for optional optimum braking segment is collected from single and incorrect source, predetermined defined acceleration. This initial failed design is then supposed to be corrected for by a quite separate anti-skid brake energy modulation technique. On the feed line pressure side a relative too high brake energy pressure will build up, like when pushing a brake pedal all the way to bottom, and if anti-skid modulation logic immediately identify uneven spots of braking action (wheel to wheel or single wheel irregularity), situation may occur where contradiction ally signals from anti-skid comparator logic will cause situations of what in between pilots is known as, "hysteresis" anti-skid brake regulation. Runways are known to be more homogeneous in contamination appearance than highways, however including a poor micro texture pavement top surface, really scarily situations might occur. Further, when influenced by strong crosswind component lateral forces (Lateral G) strongly act on aircraft body, something that again directly cause very bad influence on braking action; longitudinal direction stability and extended landing stop distance. Many aircraft runway overruns have clear indication of such.

It is an urgent need to take a closer look at anti-skid proportional valves performance. Primarily service operation is pulsing/proportional dilution of brake energy pressure based on command from differential comparative monitoring wheel-to-wheel etc. Anti-skid proportional pulsing sequence is very rapid proportional (frequency of ca. 50 mille seconds). General overview modern anti-skid brake logic have 4 main duties;

1. React prompt via comparing wheel rotation between two partner wheels,
2. React prompt on rotation irregularity on single wheel,
3. Dampening resonance vibration in landing wheel undercarriage,
4. Attempt to keep within a maximum slip (determined by percent figure, 10-13%) identified in relation to maximum ground velocity during certification manoeuvre.

This principle will by initial evaluation of functioning in very high ground velocity, describe high friction coefficient value and thereby steep friction curve. When during lower friction coefficient values, were friction curves appear more flat-shallow, boundary layer in relation to PFN will become more random and unpredictable. Based on notifications from pilots however indicate discrepancies are to be noticeable.

Further to be noticed, when runway contamination has a frozen consistence heat development in tire, this due as well friction as viscous movement in tire-Normal Force influence, Fn, heat develop melting energy in tire/surface interface boundary layer causing micro texture initially supporting braking action a melting process conversion to water, eventually water on ice. Result might be aqua planning on ice causing boundary layer becoming even more imprecise. Such process is defined as aggregate change, and risk of complete loss of braking control/directional stability increases dramatically when during reducing ground velocity. A computer algorithm model therefore initial ought to be designed based on variation in velocity, since acceleration is namely "velocity variation over time", including controlling variation within Mu values, rather than based on dry condition. Illustrations from reality world can refer to extreme changeable and complex braking action situations. Related industry so far seem to have overseen facts as such, since field of interest is to be identified not primarily in slippery conditions, however dry pavement surface where certification of maximum gross weights are to be found. Since friction analysis business has been earlier mentioned, dynamic friction by definition is—Mu=Fh/Fn, (Force Horizontal over Force Normal). Traditionally Mu by definition bases scale value in a linear scale from 0.1 to 1.0. Fn thereby being defined as a defined component, and including Fh to be an identification of Mu. In aviation industry however, the method of "testing-failing" is the rule. Date collection (stopping distance) based on empiric dynamic acceleration/stop collection of tests continues until being able to reproduce an estimation model in the purpose of a Fh/Fn (airplane Mu) very point $V_1$ for maximum take-off structural gross weight. Exactly at this point this will correspond to documented Nature law of acceleration:

$$F=M \times A,$$

where
F=Force
M=Mass
A=Acceleration;

However only at this very point. Nature law referring to is by definition the velocity variation law, Newton's Laws). Under the initial subject mentioned braking pattern appearance, first of all a mayor change will be A, and if so F will have to be corrected for since being changed by changing A, and F must then regardless be corrected for even if M is constant. In the case of changing M (becoming less than maximum take-off gross weight during certification dynamic tests) the total evaluation will have to be revised to correspond with a correct $F=M \times A$ evaluation. This is where logic design betray the pilot completely when needed most, during contaminated runway operation, where a well fit acceleration correspond design adjusted anti-skid brake logic open for natural variation in F as well as M.

This innovation aim for a self-adjustable braking energy force application any time for optimal braking of a tire in direct real time relation to any defined pavement condition, a surface which also might vary considerable over distance to go, which is usually the case during contaminated conditions, wet or winter contaminated. Basis for dynamic brake controlling algorithm is by utilising real time information obtained from external real forces applying to the aircraft in combination to aircraft own references. Vehicle/aircraft acceleration during ground operation gives in real time continuous a total picture of all forces applied to vehicle/aircraft, this including air drag resistance, wheel rolling resistance, wheel braking and influence from reversed engine thrust energy. Acceleration will at any time describe vehicle/aircraft ground friction/braking action grip, going up, increasing or down, decreasing. Therefore by in real time monitoring/utilizing acceleration change over time, namely the forth dimension, in a given situation will identify the culmination turning point, which will be the top point of friction, or other vice defined as the vehicle/aircraft breaking maximum performance, PFN.

This innovation is achieved by methods and system defined in self-contained patent claims no. 1 and no. 2.

This innovation requires no physical additional installations or extra installations. For modern aircraft ("new generation") this innovation might be implemented as a pure additional control algorithm in existing brake control unit. This innovation will require admission to existing data flight management control system, where defined essential data will be tapped and rerouted to the brake control unit.

This innovation will in FIG. 3 by graphic illustration describe logic sense of design, including system components in an artificial box arrangement:

One or several axis including wheel/rim and tire mounted on an undercarriage or any other arrangement installed in a vehicle or an aircraft. This illustration is based on a single axis and a single rim/wheel.

Axis including rim is equipped with standard type of hydraulic brake, this including disk brake.

Brake energy application is brought into force by means of brake energy pressure applied as a result of vehicle/aircraft hydraulic brake system defined as system of hydraulic pressure, usually named "system hydraulic pressure".

Braking function is thereby physically controlled/adjusted by a brake pressure regulator unit/valve usually named "brake metering valve".

Brake pressure ahead/in front of brake pressure regulator unit/valve which is the tapped pressure from normal hydraulic system "system hydraulic pressure" is usually named "upstream" pressure, while pressure between brake pressure regulator unit/valve and brake unit is usually named "downstream" pressure.

Brake pressure regulator unit/valve is being controlled via a control loop, from here on named "brake control loop" which again obtain current reference signals which identify in real time vehicle/aircraft (ground) velocity and acceleration.

State-of-art aircraft are equipped with very accurate airspeed indicators identifying velocity in air—"air speed" including until lower limit ground velocity, "ground speed". System for this innovation will use ground velocity as reference.

As reference of acceleration this innovation will use aircraft own inertia navigational instrumentation, also named Inertia Reference System (IRS), further Global Positional System—GPS based systems or other systems which enable registration of vehicle/aircraft acceleration in various planes.

Modern commercial aircraft identify and registrant acceleration in three, 3, planes, horizontal, also named "longitudinal", sideways, also named "lateral" and finally vertical true the IRS system. (Horizontal and lateral acceleration is also called Horizontal G and lateral G).

As for this innovation and acceleration reference only longitudinal acceleration, or a vector basis of acceleration as a result of lateral influence will be used, from hereby-named "net acceleration". Net acceleration is a function of longitudinal and lateral acceleration based on Pythagoras evaluation from "length of hypotenuse in a square angled triangle", thereby:

$$A_{net}^2 = A_{long}^2 + A_{lat}^2$$

where
$A_{net}$ = Net acceleration
$A_{long}$ = Longitudinal acceleration
$A_{lat}$ = Lateral acceleration.

Net acceleration will therefore be:

$$A_{net} = 1/(A_{long}^2 + A_{lat}^2)^{-1/2}$$

In a brake control unit loop one might therefore utilize either net acceleration information input, or longitudinal acceleration information input only. In purpose of illustration definition evaluation for easy sake the expression acceleration will be used in both cases, since these detail differences will not rock the basis principle in this new innovation logic.

Illustration will define this innovation based on traditional hydraulic brake system design, however same principle logic in an all-electronic brake control system might be transferred to as such.

FIG. 4, "flow chart", illustrate how this innovation brake control logic algorithm loop will work, where;

"v"=Velocity, denominated in km/hr, miles/knots or any other velocity reference evaluation $g_t$: Acceleration in real time denominated ii m/s², ft/s² or any other reference for acceleration evaluation.

$g_{t-1}$ Acceleration since last time interval. This could be a second or a fraction of a second.

BP: Brake pressure measured in "psi" or any other reference source for pressure, which is applied to brake system via "system hydraulic pressure".

Box 1.
If h>0
Here the system will define whether vehicle/aircraft has ground speed a control function to a velocity reference.

If "NO" this will be referred to Box 2
If "YES" this will be referred to Box 3
Box 2.
END
The vehicle/aircraft has no ground speed or velocity, therefore no action.
Box 3.
Box 1 has established that the vehicle has ground speed.
Brake pressure is applied incrementally Energy validity of such increment will have to be evaluated based on empiric experience, however assumed to be in the area of 10-25 psi brake energy pressure.
Box 4.
If $g_t \geq 0$
Subsequently one will test out vehicle/aircraft acceleration level (were negative acceleration will be equal to retardation) by establishing acceleration in real-time (through an acceleration reference).

If "YES" which means that vehicle/aircraft maintain a constant groundspeed or in reality acceleration further brake pressure is applied, whereupon next function will be performed signal return via loop back to Box 3.

If "NO" which means a "negative" acceleration or rather "retardation" next function will be signal referring further to Box 5.
Box 5.
Acceleration variation will be tested over time, where real-time acceleration data will be compared with acceleration data from previous time segment. Time segment depends on several items, among others frequency of acceleration references. One will assume an initial optimum identification will take place several times per second. Test of such and merging data identification is based on following items:

If $g_t < g_{t-1}$
If "YES" it means that vehicle/aircraft in real time still identify an absolute increase in retardation, were a new/added brake pressure will be needed. Therefore a loop lead signal back to Box 3 for this real time condition. If "NO" the absolute acceleration has become less compared to previous time segment. This means Peak friction point has just been passed, and one will have to reduce applied brake pressure.

In a form of loop required function will return to earlier function described in Box 1.
Box 6.
Here applied brake pressure will be reduced. This will take place in incremental reductions, probably in increments of 25-50 psi.

After this function one will via a loop go back to Box 1, which repeats the process/function 30-40 ganger per second.

This loop will continue until the vehicle/aircraft no longer has longitudinal velocity.

Due to great mass energy in aircraft, it is quite possible that a brake control unit loop algorithm will contain some functions that enables the system to become to much sensitive to small and sudden changes in acceleration reference data.

The invention claimed is:

1. A brake control system, comprising:
an accelerometer configured to measure a linear deceleration of a vehicle body and output a measured deceleration signal;
a brake pressure sensor configured to output a brake pressure signal; and
a brake controller configured to:
receive the measured deceleration signal from the accelerometer and calculate a change in linear deceleration over time;
receive the brake pressure signal and calculate a change in an applied brake pressure; and calculate a brake pressure adjustment signal using the calculated change in linear deceleration over time and the calculated change in applied brake pressure.

2. A method for controlling a braking operation, comprising:
applying brake pressure to a wheel of a vehicle body;
measuring a linear deceleration of the vehicle body;
increasing the brake pressure to the wheel after the brake pressure has been applied, wherein the brake pressure to the wheel is increased from a first time frame to a second time frame;
calculating a change in linear deceleration of the vehicle body from the first time frame to the second time frame;
calculating a change in the brake pressure applied to the wheel from the first time frame to the second time frame; and
reducing the brake pressure applied to the wheel when the calculated change in linear deceleration becomes negative and the calculated change in brake pressure applied to the wheel is greater than or equal to zero.

3. The method of claim 2, wherein the change in linear deceleration is calculated as a vector equal to a hypotenuse in a right-angle triangle where longitudinal and lateral deceleration are equal to sides adjacent to the right-angle of the triangle.

4. The system of claim 1, wherein the vehicle body is an aircraft.

5. The system of claim 1, further comprising an automatic brake configured to receive the brake pressure adjustment signal.

6. The system of claim 1, further comprising a manual brake configured to receive the brake pressure adjustment signal.

7. The method of claim 2, wherein the vehicle body is an aircraft.

8. The method of claim 2, wherein the brake pressure is applied with an automatic brake.

9. The method of claim 2, wherein the brake pressure is applied with a manual brake.

10. The system of claim 1, wherein the change in linear deceleration over time is calculated as a vector equal to a hypotenuse in a right-angle triangle where longitudinal and lateral deceleration are equal to sides adjacent to the right-angle of the triangle.

11. The system of claim 1, wherein the change in linear deceleration over time comprises longitudinal deceleration, lateral deceleration, vertical deceleration, or a combination thereof.

12. The system of claim 1, wherein the brake controller is further adapted to determine a maximum braking capability of the vehicle body using the change in linear deceleration of the vehicle body.

13. The system of claim 1, wherein the vehicle deceleration signal comprises at least one of longitudinal, lateral, and vertical deceleration data.

14. The system of claim 1, wherein the brake controller is further adapted to output deceleration data to a data storage file or a display.

15. The method of claim 2, wherein the change in linear deceleration over time comprises longitudinal deceleration, lateral deceleration, vertical deceleration, or a combination thereof.

16. A method for controlling a braking operation of a vehicle body, comprising:
applying brake pressure to a wheel of the vehicle body;
increasing the brake pressure to the wheel for a length of time;
calculating a change in linear deceleration of the vehicle body over the length of time;
determining a maximum braking capability of the vehicle body using the calculated change in linear deceleration of the vehicle body over the length of time; and
varying the brake pressure applied to the wheel based on the determined maximum braking capability of the vehicle body.

17. The method of claim 2, wherein brake pressure applied to the wheel is reduced by a predetermined pressure increment.

18. The method of claim 2, wherein the linear deceleration of the vehicle body represents information about optimal braking capability of the vehicle body when the calculated change in linear deceleration becomes negative and the calculated change in brake pressure applied to the wheel is greater than or equal to zero.

19. The method of claim 2, wherein the brake pressure applied to the wheel is reduced when velocity of the vehicle body is greater than zero.

20. The method of claim 2, wherein the brake pressure applied to the wheel is increased incrementally.

* * * * *